(12) United States Patent
Moennig

(10) Patent No.: US 9,428,106 B2
(45) Date of Patent: Aug. 30, 2016

(54) ABS/ESC ACTIVATED BRAKE LIGHT DEVICE

(71) Applicant: Herold Richard Moennig, Lake Bluff, IL (US)

(72) Inventor: Herold Richard Moennig, Lake Bluff, IL (US)

( * ) Notice: Subject to any disclaimer, the term of this patent is extended or adjusted under 35 U.S.C. 154(b) by 44 days.

(21) Appl. No.: 14/272,492

(22) Filed: May 7, 2014

(65) Prior Publication Data

US 2015/0073676 A1   Mar. 12, 2015

Related U.S. Application Data

(60) Provisional application No. 61/820,308, filed on May 7, 2013.

(51) Int. Cl.
| | |
|---|---|
| *B60T 8/00* | (2006.01) |
| *H01R 13/68* | (2011.01) |
| *B60Q 1/44* | (2006.01) |
| *B60T 8/36* | (2006.01) |

(52) U.S. Cl.
CPC ............. *B60Q 1/448* (2013.01); *B60T 8/368* (2013.01)

(58) Field of Classification Search
CPC ........ B60Q 1/444; B60Q 1/448; B60Q 1/44; B60T 8/17616; B60T 8/00; E05B 77/48; H02J 7/1423; B60R 16/0238; H01R 13/68
USPC .......... 701/70; 340/479; 188/1.11; 303/167; 70/264; 320/126; 307/10.1; 439/620.29
See application file for complete search history.

(56) References Cited

U.S. PATENT DOCUMENTS

| | | | | |
|---|---|---|---|---|
| 3,533,383 A * | 10/1970 | Macmanus | ............ | B60K 31/02 123/352 |
| 3,593,273 A * | 7/1971 | Teich | .................... | B60R 25/04 340/428 |
| 4,207,511 A * | 6/1980 | Radtke | ................. | H02J 7/1423 320/126 |
| 4,744,231 A * | 5/1988 | Takagi | .................... | E05B 77/48 327/398 |
| 4,785,615 A * | 11/1988 | Leigh-Monstevens | . | F15B 7/005 200/61.88 |
| 5,139,115 A * | 8/1992 | Browne | ................... | B60Q 1/44 188/1.11 E |
| 5,949,148 A * | 9/1999 | Wagner | ............... | B60R 16/0238 307/10.1 |
| 6,168,471 B1 * | 1/2001 | Santa Cruz | ........... | H01R 13/68 439/620.29 |
| 6,278,364 B1 | 8/2001 | Robert | | |
| 6,417,767 B1 | 7/2002 | Carlson et al. | | |
| 6,424,256 B1 | 7/2002 | Ryder | | |
| 6,831,572 B2 | 12/2004 | Strumolo et al. | | |
| 7,155,329 B2 | 12/2006 | Mepham et al. | | |
| 7,698,040 B2 | 4/2010 | Long | | |
| 7,893,823 B2 | 2/2011 | Morales | | |
| 8,441,347 B2 | 5/2013 | Marlowe et al. | | |
| 2002/0133282 A1 | 9/2002 | Ryan et al. | | |
| 2003/0122663 A1 | 7/2003 | Carlson et al. | | |
| 2003/0201886 A1 | 10/2003 | Robbins et al. | | |
| 2006/0022520 A1 * | 2/2006 | Matheny | ............ | B60T 8/17616 303/167 |
| 2006/0273891 A1 | 12/2006 | Quach et al. | | |
| 2008/0079555 A1 * | 4/2008 | Wang | .................... | B60Q 1/448 340/479 |
| 2009/0261963 A1 | 10/2009 | Ault | | |
| 2013/0036814 A1 * | 2/2013 | Neumann | ............ | B60T 17/225 73/290 R |

* cited by examiner

*Primary Examiner* — Yuri Kan
(74) *Attorney, Agent, or Firm* — Daniel J. Chalker; Edwin S. Flores; Chalker Flores, LLP

(57) ABSTRACT

An ABS/ESC activated brake light device includes a first connector, a second connector, an antilock brake system and/or electronic stability control (ABS/ESC) signal detection circuit connected to the first connector, a control circuit connected to the ABS/ESC signal detection circuit, a brake light signal generation circuit connected to the control circuit and the second connector, and a power supply. The first connector is configured to plug into an antilock brake system pump motor circuit on a fuse panel of a vehicle. The second connector is configured to plug into a brake light circuit on the fuse panel of the vehicle. The control circuit sends one or more control signals to the brake light generation circuit whenever an ABS/ESC signal is detected. The brake light signal generation circuit causes the brake lights of the vehicle to flash whenever the one or more control signals are received from the control circuit.

26 Claims, 8 Drawing Sheets

ABS/ESC ACTIVATED BRAKE LIGHT DEVICE

CROSS-REFERENCE TO RELATED APPLICATIONS

This application claims priority to U.S. Provisional Patent Application No. 61/820,308, filed on May 7, 2013, which is hereby incorporated by reference in its entirety.

INCORPORATION-BY-REFERENCE OF MATERIALS FILED ON COMPACT DISC

Not Applicable.

TECHNICAL FIELD OF THE INVENTION

The present invention relates in general to the field of vehicle safety, and more specifically to an ABS/ESC activated brake light device.

STATEMENT OF FEDERALLY FUNDED RESEARCH

Not Applicable.

BACKGROUND OF THE INVENTION

Without limiting the scope of the invention, its background is described in connection with vehicle safety. Despite the sophistication of modern vehicles, the brake light systems of vehicles today remain very simple—an operator applies pressure to the brake pedal and the brake lights are illuminated. A vehicle's brake lights indicate that the operator is applying pressure to the brake pedal, but do not indicate the urgency of the braking or magnitude of the deceleration. In other words, the brake lights "light up" in the same manner whether the vehicle is making a soft stop or a hard or panic stop. As a result, those following the vehicle have a difficult time determining if the braking is a soft stop or a hard or panic stop.

Warning other nearby vehicles of rapid or urgent deceleration of a vehicle has been of great interest, but has not been adopted by car manufacturers most likely as a result of cost, reliability concerns and/or lack of governmental regulations. The proposed systems typically require installation of various sensors, such as accelerometers, and processor(s) to calculate deceleration values that are then compared to threshold values to determine whether to illuminate the brake lights. Some of these systems illuminate the brake lights even if the operator does not apply pressure to the brake pedal.

There is, therefore, a need for an inexpensive, reliable and easily installed device to warn others that a vehicle is braking hard, sliding, or not under control.

SUMMARY OF THE INVENTION

The present invention alerts other drivers that the vehicle ahead of them is braking hard, sliding, or not under control enabling the other drivers to react more quickly. This device provides a rapid flashing brake light when there is a hard or panic stop, or when the vehicle is not operating under normal circumstances.

For example, the present invention enhances the safety feature of a vehicle's existing automatic braking system (ABS) and electronic stability control (ESC) by interlocking it with the vehicles brake lighting system. Anytime the ABS and/or ESC are activated, a signal is sent to the brake light circuitry causing a rapid flashing that will provide warning to other drivers behind that the vehicle ahead of them may be having a hard or panic stop, or loss of control of the automobile. One embodiment of the present invention provides a small battery operated unit, which provides additional safety, and easily plugs into a vehicle's fuse panel or box without modifying the vehicle's systems, thus making the device appealing to the automobile aftermarket industry More specifically, the present invention provides an apparatus that includes a first connector, a second connector, an antilock brake system and/or electronic stability control (ABS/ESC) signal detection circuit, a control circuit, a brake light signal generation circuit, and a power supply. The first connector is configured to plug into an antilock brake system pump motor circuit on a fuse panel or box of a vehicle. The second connector is configured to plug into a brake light circuit on the fuse panel or box of the vehicle. The ABS/ESC signal detection circuit is connected to the first connector. The control circuit is connected to the ABS/ESC signal detection circuit and sends one or more control signals to the brake light generation circuit whenever the ABS/ESC signal detection circuit detects an ABS/ESC signal. The brake light signal generation circuit is connected to the control circuit and the second connector. The brake light signal generation circuit causes the brake lights of the vehicle to flash whenever the one or more control signals are received from the control circuit. The power supply is connected to the control circuit and the brake light signal generation circuit.

In addition, the present invention provides an apparatus that includes a first connector, a second connector, an induction coil detector, a first magnetic reed switch, a second magnetic reed switch, a timer circuit, a control circuit, a brake light signal generation circuit, and a power supply. The first connector is configured to plug into an antilock brake system pump motor circuit on a fuse panel or box of a vehicle. The second connector is configured to plug into a brake light circuit on the fuse panel or box of the vehicle. The second magnetic reed switch is configured to be positioned next to an ignition latching relay on the fuse panel or box of the vehicle. The induction coil detector is connected to the first connector. The first magnetic reed switch is connected to the induction coil detector. The second magnetic reed switch is connected to the third connector. The timer circuit is connected to the second magnetic reed switch and disables a brake light signal generation circuit for a time period after the second magnetic reed switch detects an ignition signal. The control circuit is connected to the first magnetic reed switch and the timer circuit, and sends one or more control signals to the brake light generation circuit whenever the first magnetic reed switch detects an ABS/ESC signal. The brake light signal generation circuit is connected to the control circuit and the second connector. The brake light signal generation circuit causes the brake lights of the vehicle to flash whenever the one or more control signals are received from the control circuit and the brake light signal generation circuit is not disabled by the timer circuit. The power supply is connected to the timer circuit, control circuit and the brake light signal generation circuit.

Moreover, the present invention provides a method for flashing the brake lights of a vehicle by providing an apparatus that includes a first connector configured to plug into an antilock brake system pump motor circuit on a fuse panel or box of a vehicle, a second connector configured to plug into a brake light circuit on the fuse panel or box of the vehicle, an antilock brake system and/or electronic stability control (ABS/ESC) signal detection circuit connected to the first connector, a control circuit connected to the ABS/ESC signal detection circuit, a brake light signal generation circuit connected to the control circuit and the second connector, and a power supply connected to the control circuit and the brake light signal generation circuit. One or more control signals are sent to the brake light generation circuit using the control circuit whenever an ABS/ESC signal is detected by the ABS/ESC signal detection circuit. The brake lights of the vehicle are flashed using the brake light signal generation circuit whenever the one or more control signals are received from the control circuit.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims. As used herein, a vehicle can be a car, a truck, a van, a motorcycle, a recreational vehicle, a motorized equipment, a combination thereof, or any other type of moving object having brake lights.

Figure 1:
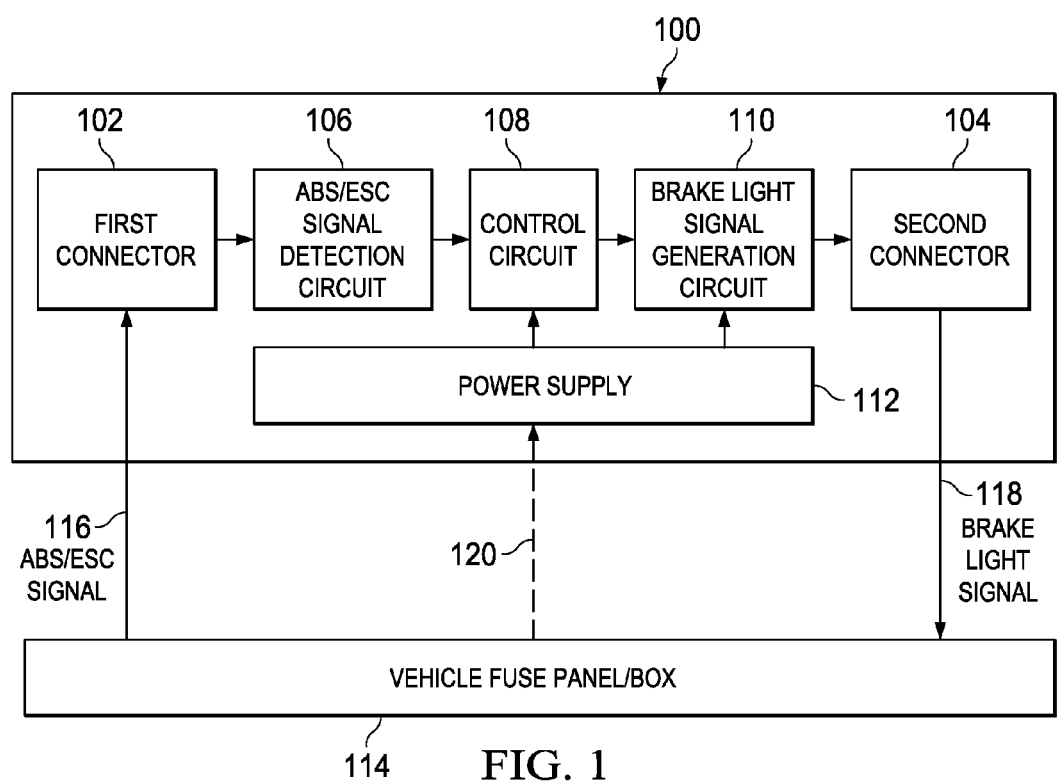
FIG. 1 is a block diagram of an apparatus in accordance with one embodiment of the present invention.

Now referring to FIG. 1, a block diagram of an apparatus 100 in accordance with one embodiment of the present invention is shown. The apparatus 100 includes a first connector 102, a second connector 104, an antilock brake system and/or electronic stability control (ABS/ESC) signal detection circuit 106, a control circuit 108, a brake light signal generation circuit 110, and a power supply 112. The first connector 102 is configured to plug into an antilock brake system pump motor circuit on a fuse panel or box 114 of a vehicle. The second connector 104 is configured to plug into a brake light circuit on the fuse panel or box 114 of the vehicle. Note that the first connector 102 and second connector 104 can be of any type, make, configuration or manufacture as necessary to interface with the vehicle's fuse panel or box 114. The ABS/ESC signal detection circuit 106 is connected to the first connector 104. The control circuit 108 is connected to the ABS/ESC signal detection circuit 106 and sends one or more control signals to the brake light generation circuit 110 whenever the ABS/ESC signal detection circuit 106 detects an ABS/ESC signal 116. Note that the control circuit 108 can be a processor, microcontroller, integrated circuit, logic circuit or other suitable electronic circuitry. The brake light signal generation circuit 110 is connected to the control circuit 108 and the second connector 104. The brake light signal generation circuit 110 sends brake light signals 118 that cause the brake lights of the vehicle to flash whenever the one or more control signals are received from the control circuit 108. The power supply 112 is connected to the control circuit 108 and the brake light signal generation circuit 110. The power supply 112 can be a battery and/or a power supply connector configured to connect to a vehicle power supply as indicated by dashed line 120. A battery recharging circuit may also be included that recharges the battery from the vehicle power supply.

The apparatus 100 typically includes a housing that encloses at least a portion of the ABS/ESC signal detection circuit 106, at least a portion of the brake light signal generation circuit 110, at least a portion of the power supply 112 and the control circuit 108. A first wire connects the first connector 102 to the portion of the ABS/ESC signal detection circuit 106 within the enclosure. A second wire connects the second connector 105 to the portion of the brake light signal generation circuit 110 within the enclosure. The phrase "portion of" means that all or part of the components forming the named circuit are disposed within the housing. For example, the named circuit might have two components where one component is integrated into the connector or wire and the second component is on the device circuit board. The apparatus is preferably housed and configured such that the first connector 102 and the second connector 104 plug into the fuse panel or box 114 of the vehicle with little to no modification of an electrical or control system of the vehicle.

The apparatus may include many additional features as will be appreciated by those skilled in the art. Some non-limiting examples include: (1) an on/off switch that disables the apparatus without preventing normal operation of the vehicle; (2) a flash rate speed control circuit connected to the control circuit 108; (3) the control circuit 108 generates the one or more control signals for a minimum period of time regardless of a duration of the ABS/ESC signal; and/or (4) a communications interface to change various operating parameters, update firmware or software or otherwise configure the device. The flash rate speed control circuit can operate at a first flash rate for incandescent brake lights, a second flash rate for solid-state brake lights, or other desired flash rate.

Figure 2:
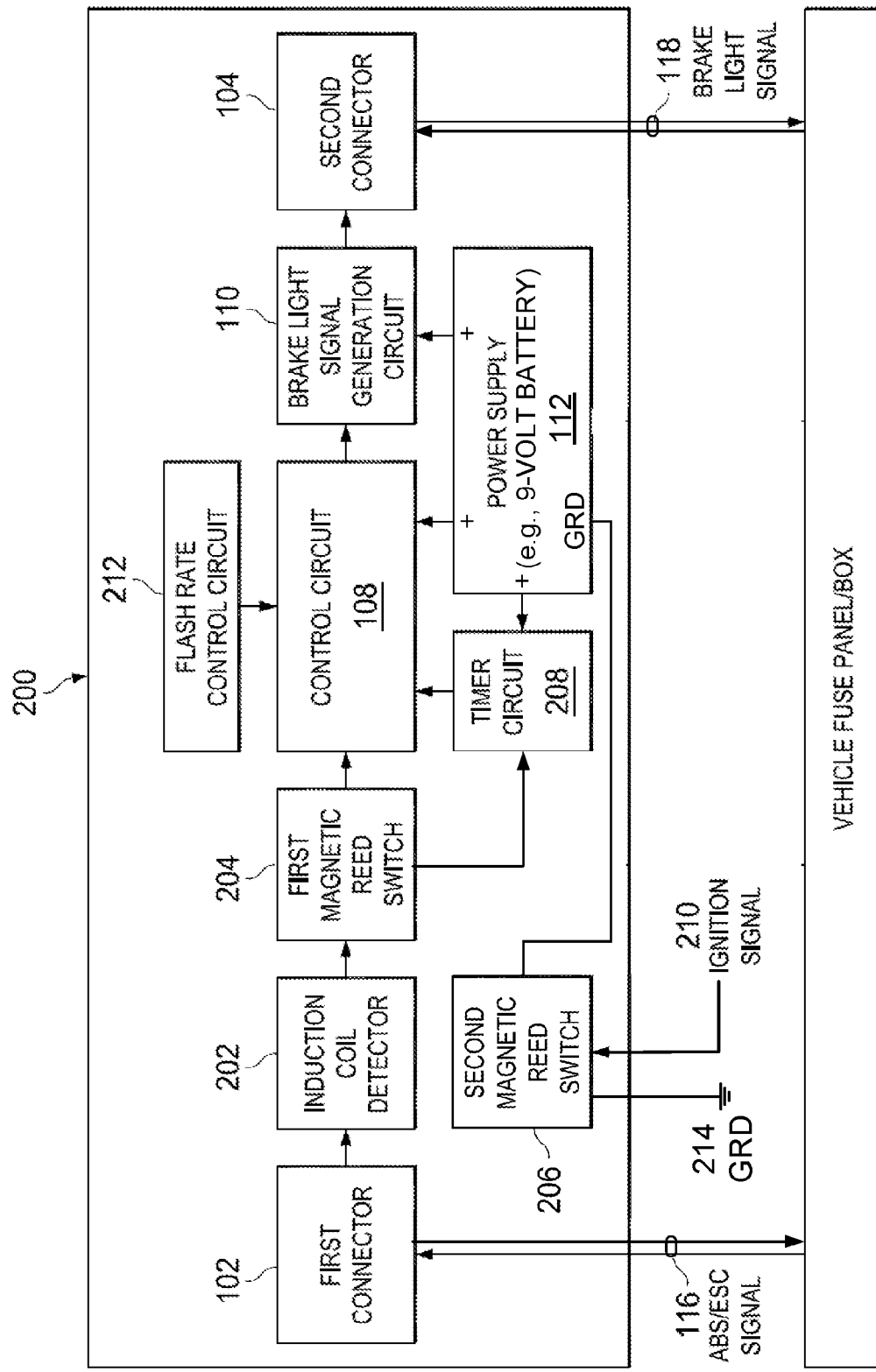
FIG. 2 is a block diagram of an apparatus in accordance with another embodiment of the present invention.

Referring now to FIG. 2, a block diagram of an apparatus 200 in accordance with one embodiment of the present invention is shown. The apparatus 200 includes a first connector 102, a second connector 104, an induction coil detector 202, a first magnetic reed switch 204, a second magnetic reed switch 206, a timer circuit 208, a control circuit 108, a brake light signal generation circuit 110, and a power supply 112. The first connector 102 is configured to plug into an antilock brake system pump motor circuit on a fuse panel or box 114 of a vehicle. The second connector 104 is configured to plug into a brake light circuit on the fuse panel or box 114 of the vehicle. The second magnetic reed switch 206 is connected to the apparatus ground 214 and configured to be positioned next to an ignition latching relay on the fuse panel or box 114 of the vehicle. Note that the second magnetic reed switch 206 can be integrated into a third connector. The induction coil detector 202 is connected to the first connector 102. The first magnetic reed switch 204 is connected to the induction coil detector 202. The timer circuit 208 is connected to the power supply 112 and disables the brake light signal generation circuit 110 for a time period after the second magnetic reed switch 206 detects an ignition signal 210 and connects the power supply ground to the vehicle ground 214. The control circuit 108 is connected to the first magnetic reed switch 204 and the timer circuit 208, and sends one or more control signals to the brake light generation circuit 110 whenever the first magnetic reed switch 204 detects an ABS/ESC signal 116. Note that the control circuit 108 can be a processor, microcontroller, integrated circuit, logic circuit or other suitable electronic circuitry. The brake light signal generation circuit 110 is connected to the control circuit 108 and the second connector 104. The brake light signal generation circuit 110 send brake light signals 118 that cause the brake lights of the vehicle to flash whenever the one or more control signals are received from the control circuit 108 and the brake light signal generation circuit 110 is not disabled. The power supply 112 is connected to the timer circuit 208, control circuit 108 and the brake light signal generation circuit 110. The power supply 112 can be a battery (e.g., a 9-volt battery) and/or a power supply connector configured to connect to a vehicle power supply. A battery recharging circuit may also be included that recharges the battery 112 from the vehicle power supply.

The apparatus typically includes a housing that encloses at least a portion of the induction coil detector 202, at least a portion of the brake light signal generation circuit 110, at least a portion of the power supply 112, the timer circuit 208 and the control circuit 108. The phrase "portion of" means that all or part of the components forming the named circuit are disposed within the housing. A first wire connects the first connector 102 to the portion of the induction coil detector 202 within the enclosure. A second wire connects the second connector 104 to the portion of the brake light signal generation circuit 110 within the enclosure. A third wire connects the second magnetic reed switch 206 to the timer circuit 208 within the enclosure. The apparatus is preferably housed and configured such that the first connector 102, the second connector 104 and the second magnetic reed switch 206 plug into the fuse panel or box 114 of the vehicle with little to no modification of an electrical or control system of the vehicle.

Figure 3:
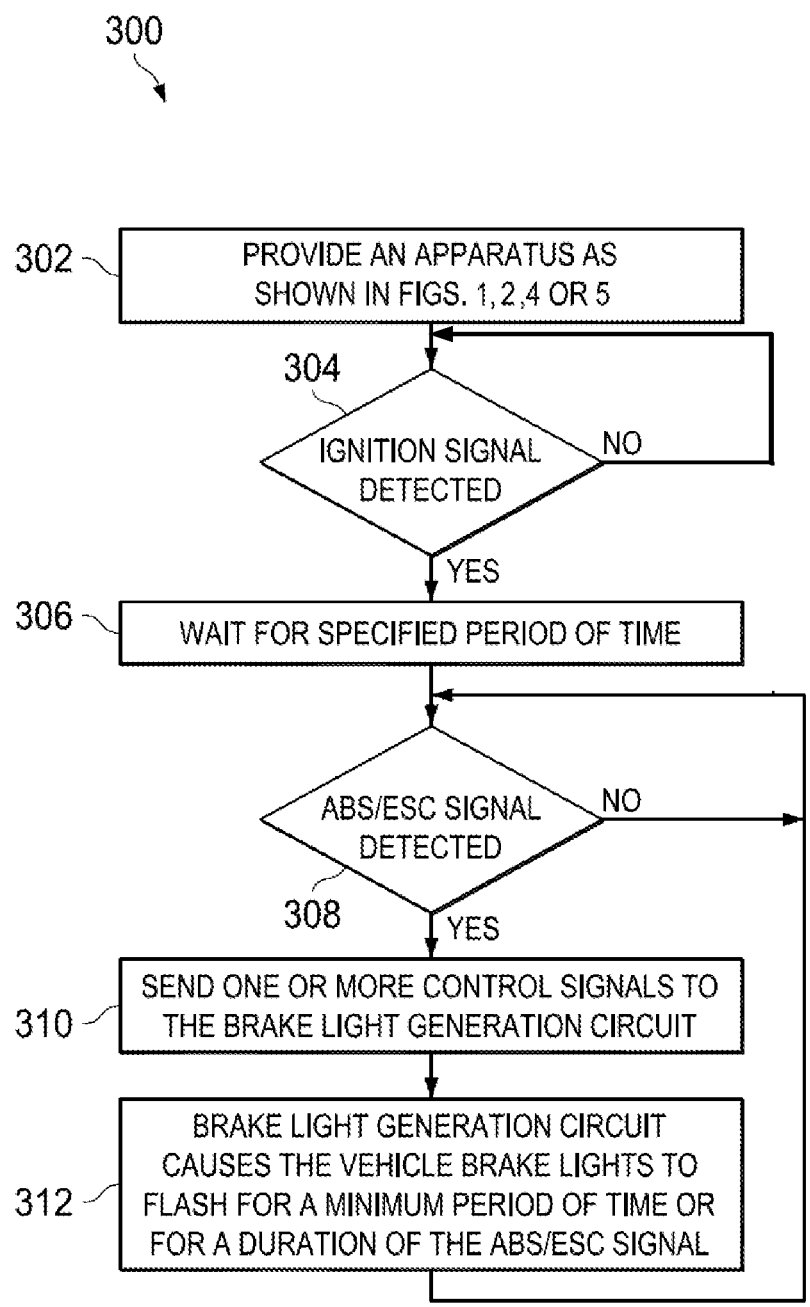
FIG. 3 is a flow chart of a method for flashing the brake lights of a vehicle in accordance with one embodiment of the present invention.

The apparatus may include many additional features as will be appreciated by those skilled in the art. Some non-limiting examples include: (1) an on/off switch that disables the apparatus without preventing normal operation of the vehicle; (2) a flash rate speed control circuit 212 connected to the control circuit 108; (3) the control circuit 108 generates the one or more control signals for a minimum period of time regardless of a duration of the ABS/ESC signal; (4) change or adjust the time delay; and/or (5) a communications interface to change various operating parameters, update firmware or software or otherwise configure the device. The flash rate speed control circuit can operate at a first flash rate for incandescent brake lights, a second flash rate for solid-state brake lights or other desired flash rate Now referring to FIG. 3, a method for flashing the brake lights of a vehicle in accordance with one embodiment of the present invention is shown. An apparatus (e.g., FIGS. 1, 2, 4 or 5) is provided in block 302. The apparatus typically includes a first connector configured to plug into an antilock brake system pump motor circuit on a fuse panel or box of a vehicle, a second connector configured to plug into a brake light circuit on the fuse panel or box of the vehicle, an ABS/ESC signal detection circuit connected to the first connector, a control circuit connected to the ABS/ESC signal detection circuit, a brake light signal generation circuit connected to the control circuit and the second connector, and a power supply connected to the control circuit and the brake light signal generation circuit. If an ignition signal is detected, as determined in decision block 304, the process waits for an ignition signal to be detected as shown by the "No"arrow from decision block 304. During this operational mode, the power supply does not provide power to the apparatus. Thereafter when an ignition signal is detected, as determined in decision block 304, the process waits for a specified period of time in block 306, Thereafter and as determined in decision block 308, the process waits for an ABS/ESC signal to be detected as shown by the "No"arrow from decision block 308. During this operational mode, the brake lights operate normally. When an ABS/ESC signal is detected, as determined in decision block 308, one or more control signals are send to the brake light generation circuit from the control circuit in block 310. In response, the brake light generation circuit causes the vehicle brake lights to flash for a minimum period of time or a duration of the ABS/ESC signal in block 312. During this operational mode, the brake lights flash. Thereafter, the process loops back to wait for an ABS/ESC signal in decision block 308. The process resets when the vehicle is turned off.

Additional steps may include: (1) installing the apparatus by plugging the first connector into an ABS pump motor circuit on a fuse panel or box of a vehicle, and plugging the second connector into a brake light circuit on the fuse panel or box of the vehicle; (2) recharging the battery from the vehicle power supply; (3) flashing the brake lights at a first flash rate for incandescent brake lights and a second flash rate for solid-state brake lights; and/or (4) generating the one or more control signals for a minimum period of time regardless of a duration of the ABS/ESC signal.

Figure 4:
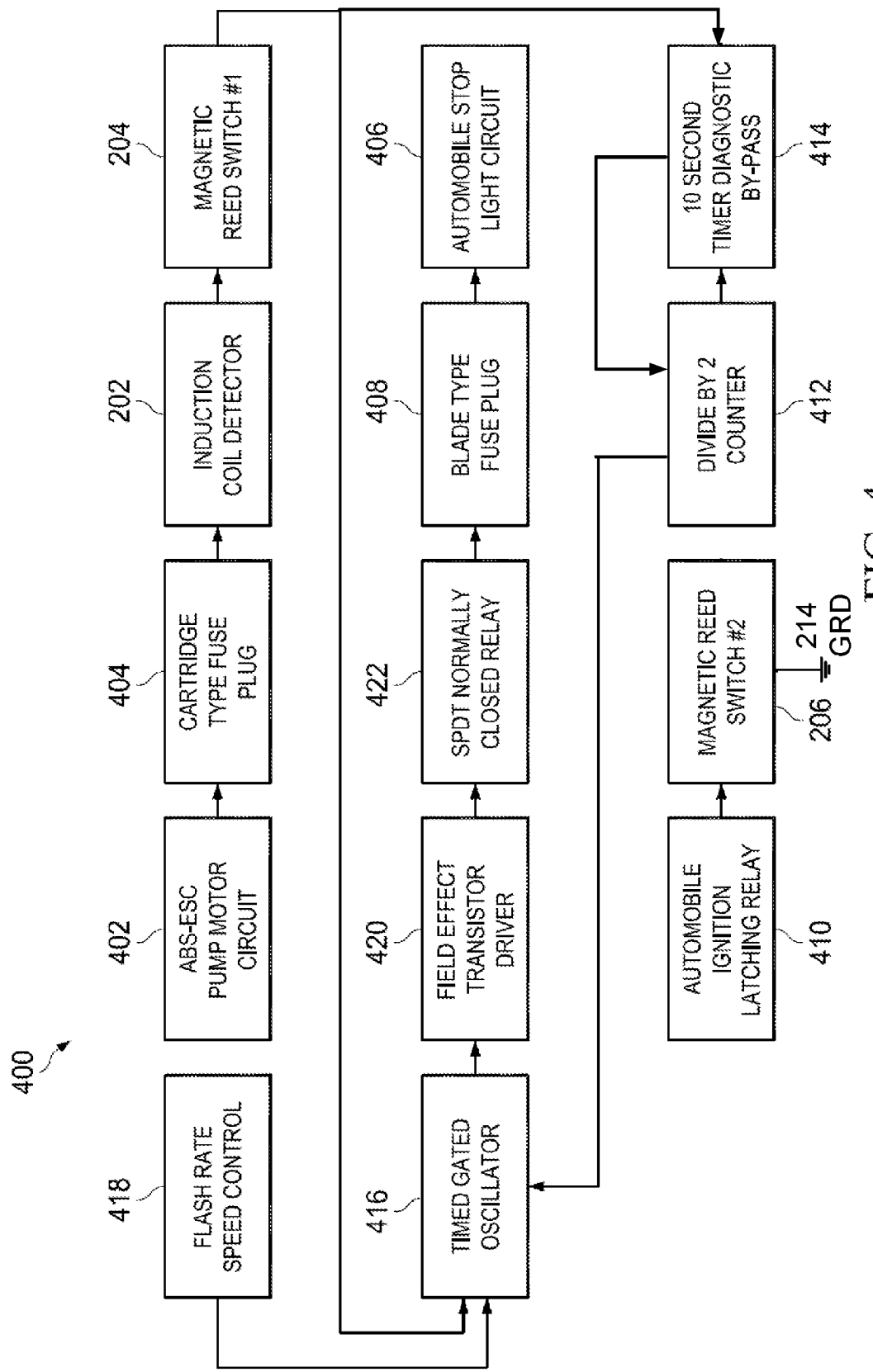
FIG. 4 is a block diagram of the ABS/ESC activated rapid fire brake light device in accordance with one embodiment of the present invention.

Referring now to FIG. 4, a block diagram of the ABS/ESC activated rapid fire brake light device 400 in accordance with one embodiment of the present invention is shown. The device connects to: (1) the vehicle's ABS/ESC pump motor circuit 402 using a cartridge type fuse plug 404; (2) the automobile stop light circuit 406 using a blade type fuse plug 408; and (3) the automobile ignition latching relay 410 using a second magnetic reed switch 206. An induction coil detector 202 is connected to the cartridge type fuse plug 404. A first magnetic reed switch 204 is connected to the induction coil detector 202. The second magnetic reed switch 206 is connected to the battery ground 214. A timer diagnostic by-pass circuit 414 (e.g., 10 seconds, 30 seconds, etc.) is connected to the first magnetic reed switch 204 and attached to the divide by two counter 412. A timed gated oscillator 416 is connected to the first magnetic reed switch 204, the divide by two counter 412 and a flash rate speed control 418. A transistor switch 420 (e.g., field effect transistor) is connected to the timed gated oscillator 416. A normally closed relay 422 (e.g., single pole, double throw) is attached to the transistor switch 420 and the blade type fuse plug 408.

Figure 5:
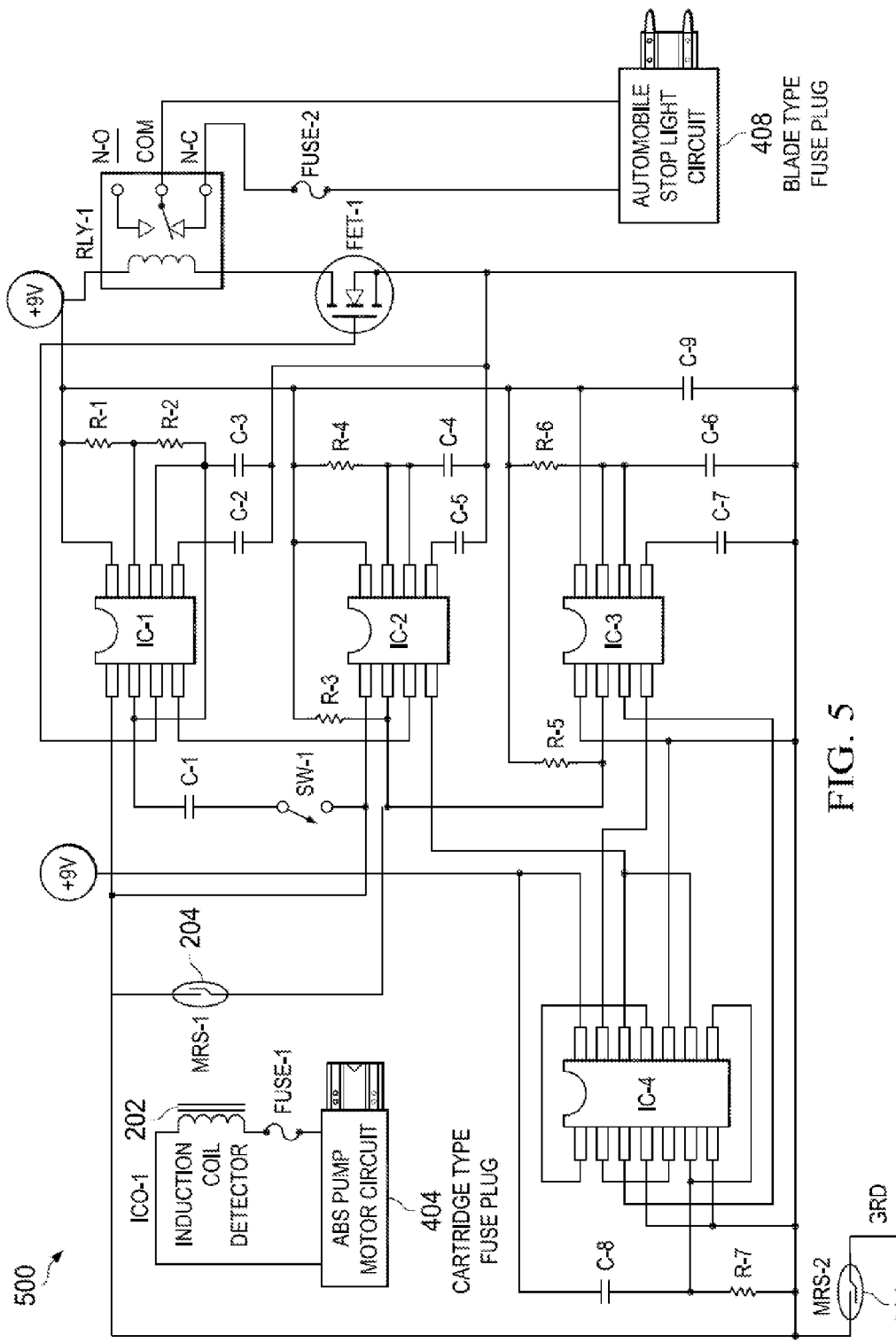
FIG. 5 is an electronic schematic of the ABS/ESC activated rapid fire warning brake light device in accordance with one embodiment of the present invention.

Now referring to FIG. 5, an electronic schematic of the ABS/ESC activated rapid fire warning brake light device 500 in accordance with one embodiment of the present invention is shown. The device 500 connects to: (1) the vehicle's ABS/ESC pump motor circuit using a cartridge type fuse plug 404; (2) the automobile stop light circuit using a blade type fuse plug 408; and (3) the automobile ignition latching relay using a second magnetic reed switch (MRS-2) 206. An induction coil detector (ICO-1) 202 is connected to the cartridge type fuse plug 404. A first magnetic reed switch (MRS-) 204 is connected to the induction coil detector (ICO-1) 202. The second magnetic reed switch (MRS-2) 206 is connected to the battery ground (GRD) 214 and supplies the battery ground (GND) 214 to the entire electronic circuit. A timer diagnostic by-pass circuit (IC-3) 208 (e.g., 10 seconds, 30 seconds, etc.) is connected to the divide by two counter (IC-4). A timed gated oscillator which embodies a monostable mutivibrator (IC-2) that controls an oscillator (IC-1), and the timer diagnostic by-pass circuit (IC-3) 208 are connected to the first magnetic reed switch (MRS-1) 204. A flash rate speed control (SW-1) is linked to the oscillator (IC-1). The timed gated oscillator (IC-1) is a non-limiting example of a control circuit 108 and may or may not include the monostable multivibrator (IC-2) and the flash rate speed control (SW-1). The timer diagnostic by-pass circuit (IC-3) and divide by two counter (IC-4) form a non-limiting example of a timer circuit 208. A transistor switch (FET-1) is connected to the timed gated oscillator (IC-1). A normally closed relay (RLY-1) is attached to the transistor switch (FET-1) and the blade type fuse plug 408. The transistor switch (FET-1) and the normally closed relay (RLY-1) are non-limiting examples of the brake light generation circuit 110.

The ABS pump motor fuse (cartridge type) (FUSE-1) is removed from the vehicle fuse panel or box and a cable with a cartridge type fuse plug 404 is inserted into it. The fuse (FUSE-1) that is removed from the vehicle fuse panel or box is plugged into the circuit board of the device 500 and keeps the ABS circuitry protected. The induction coil detector (ICD-1) 202 will detect a signal whenever the ABS pump motor is operating. The magnetic reed switch (MRS-1) 204 will react to this by closing its contacts due to the magnetic field in the induction coil.

Integrated circuit (IC-1) including resistors (R-1, R-2) and capacitors (C-2, C-3) form an stable multivibrator which is used as a gated oscillator. The output of this oscillator 416 pulses the field effect transistor (FET-1) at a specific rate which determines how fast the relay (RLY-1) contacts will open and close.

Integrated circuit (IC-2) including resistors (R-3, R-4) and capacitors (C-4, C-5) form a monostable multivibrator that controls the amount of time the gated oscillator will be activated. For example, a minimum of five flashes (or other desired number) is guaranteed regardless of the duration of the ABS signal.

Integrated circuit (IC-3) including resistors (R-5, R-6) and capacitors (C-6, C-7) form another (monostable multivibrator) that is used as a 30 second timing circuit. Other time periods can be used. Integrated circuit (IC-4) consists of two D-type bi-stable mulitvibrators which creates a divide by two counter when both D-type flip-flops are connected together. Integrated circuits (IC-3) and (IC-4) are combined to create a timer circuit 208 that will circumvent the computers (ABS/ECU) diagnostic system from falsely triggering the brake lights when the vehicle is started.

The vehicle's stop light circuit fuse (FUSE-2) is removed from the vehicle's fuse panel or box and a cable with a blade type fuse plug 408 is inserted into it. The fuse (FUSE-2) that is removed is plugged into the circuit board of device 500 and keeps the stop light circuitry protected.

Magnetic reed switch (MRS-2) and resistor (R-7) form a network that will control the divide by two counter (IC-4). The magnetic reed switch (MRS-2) is positioned next to the automobiles latching ignition relay to monitor its electrical state.

This device is a plug-in device that can be easily installed in about a minute (see enclosed pictures) (plug and play). There is no need to factory hard-wire any components to the automobiles electronics or sub-systems. This device does not use the automobiles electronic control unit (ECU) or optional computer to manipulate signals from the ABS's electronic sensors to control the flashing of the brake lights. Moreover, this device does not need to incorporate extra electronic/mechanical sensors such as accelerometers, radar beams or tilt switches.

As shown, the device contains its own power supply (9V battery), so there is no need to use the automobiles 12 volt system to power the device. But, the device can alternatively connect to the vehicle power system as the power supply and/or to recharge the device battery. The device has its own on board flasher, so there is no need to use the automobiles standard slow emergency flashers. This device utilizes selectable flash rates to accommodate either incandescent or solid state stop (brake) lights.

The operation of the circuit shown in FIG. 5 will now be described. Starting with the ignition relay off the, second magnetic reed switch (MRS-2) is in the open position. This condition disconnects battery ground (GRD) from the entire circuit board, essentially shutting down the electronic circuit. This extends the life of the 9-volt battery every time the automobile is turned off. When the ignition relay is switch on, the magnetic reed switch (MRS-2) is in the closed position. This returns battery ground (GRD) to the electronic circuit and forces the divide by two counter (IC-4) to a predetermined quiescent state. Once the engine is started, the vehicle'ignition latching relay will become energized and close the second magnetic reed switch (MRS-2). A resistive-capacitance network (R-7 and C-8) applies a temporary logic one to set pins (6 and 8) of the divide by two counter (IC-4) as soon as battery gournd (GRD) is returned to the electronic circuit board. This resets the divide by two counter (IC-4) to its normal state, a logic one for (Q-1 and Q-2). When C-8 is fully changed, the set pins (6 and 8) are returned to a logic zero and the integrated circuit (IC-4) is now enabled and ready to count.

Monostable multivibrator (IC-2) controls the amount of time the gated oscillator (IC-1) will pulse relay (RLY-1) and has its reset PIN-4 connected to IC-4's PIN-12 (a logic zero-disabled). Every time the engine is started, the (ABS) pump motor will be activated by the engine control unit's (ECU) diagnostic system and this will be detected by the induction coil detector (ICD-1). The induced magnetic field in the induction coil detector (ICD-1) will close the first magnetic reed switch (MRS-1) and trigger only the integrated circuit (IC-3) because integrated circuit (IC-2) is disabled. Integrated circuit's (IC-3) output (a logic one) will reverse the logic state of the first D-Type flip-flop, outputs (PIN-1/PIN-2) of integrated circuit (IC-4) and the second D-Type flip-flop outputs (PIN-12/PIN-13) will remain undisturbed. This blocks the ECU's diagnostic signal from activating the gated oscillator (IC-1) that will rapid flash the brake lights.

The next signal intercepted by the induction coil detector (ICD-1) will be an authentic signal from the anti-lock braking system (ABS) witch could also include traction control (TCS) and electronic stability control (ESC). Traction control (TCS) and electronic stability control (ESC) both depend on the anti-lock braking system to function . Magnetic reed switch (MRS-1) will close triggering integrated circuit (IC-3)once again. This time its output will reverse the logic state of the second D-type flip-flop outputs (PIN-12/PIN-13. This will disable the 20 second timer (IC-3) and enable integrated circuit(IC-2) that controls the gated oscillator (IC-1). The gated oscillator (IC-1) will now operate the FET driver (FET-1) and rapid flash the brake lights by opening and closing the relay (RLY-1) as a specific flash rate. The timer (IC-3) will stay disabled until the engine is shut off (ignition relay open), then the same sequence of events will start all over again when the engine is restarted.

The timing circuit of integrated circuit (IC-3) will stay disabled until the engine is turned off. When the engine is tuned back on (MRS-2) will open and reset the divide by two counter (IC-4) and the same sequence of events will now take place.

Because the automobile may have either incandescent or solid state brake lights (SW-1) and (C-4) provide a choice of flash rates, a faster flash speed for solid state (SW-1 is open) and a slower flash speed for incandescent (SW-1 is closed).

The battery saver circuit operates by using the second magnetic reed switch (MRS-2) to remove the negative terminal of the 9-volt battery from the electronic circuit when the ignition's latching relay is off (engine not operating) and reconnects the battery's negative terminal when the ignition's latching relay is on (engine operating).

Figure 6:
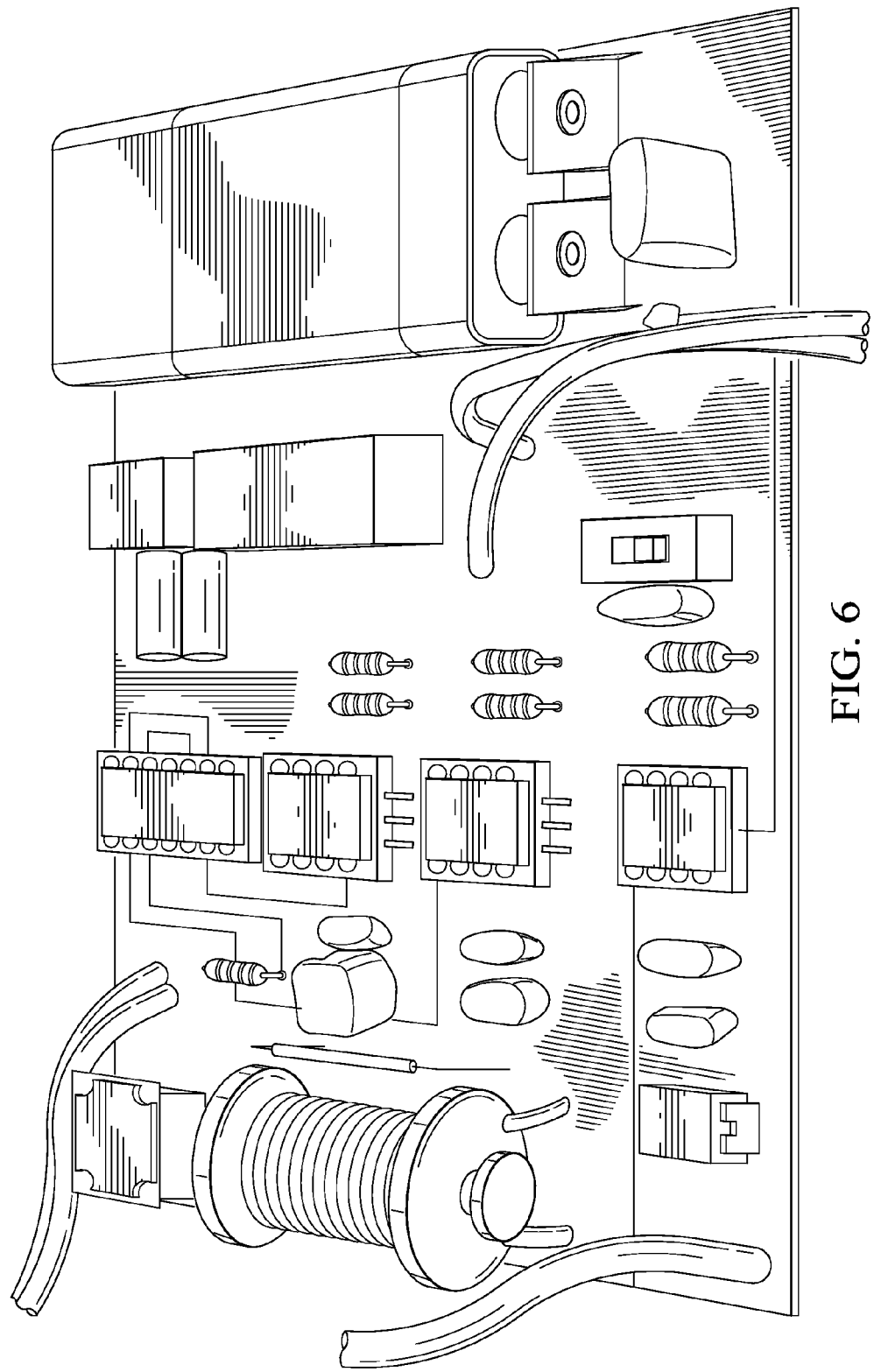
FIG. 6 is a picture of circuit board of the ABS/ESC activated rapid fire device in accordance with one embodiment of the present invention.
Figure 7:
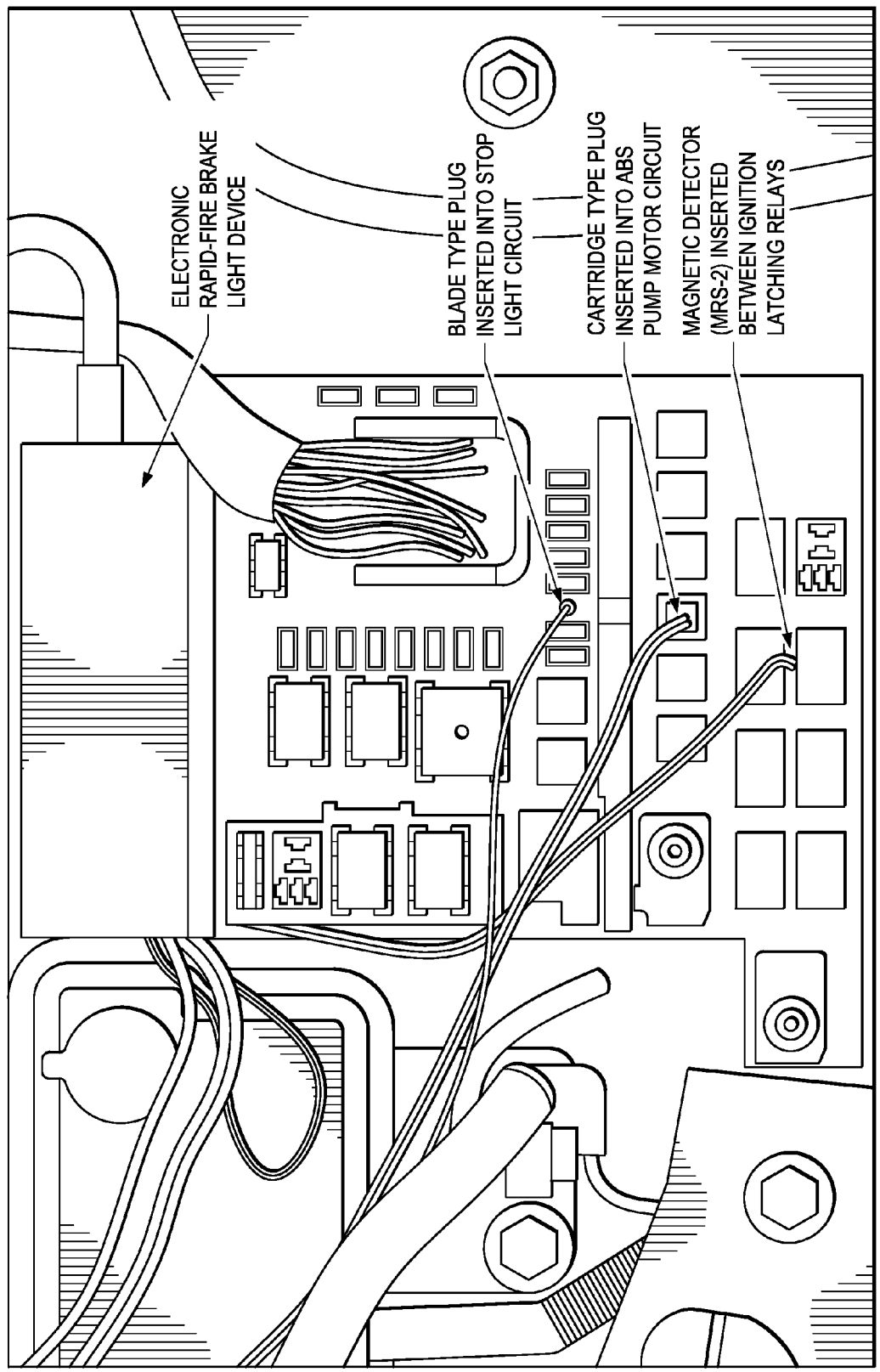
FIG. 7 is a picture of the connections to a vehicle's fuse box of the installed ABS/ESC activated rapid fire brake light device in accordance with one embodiment of the present invention.
Figure 8:
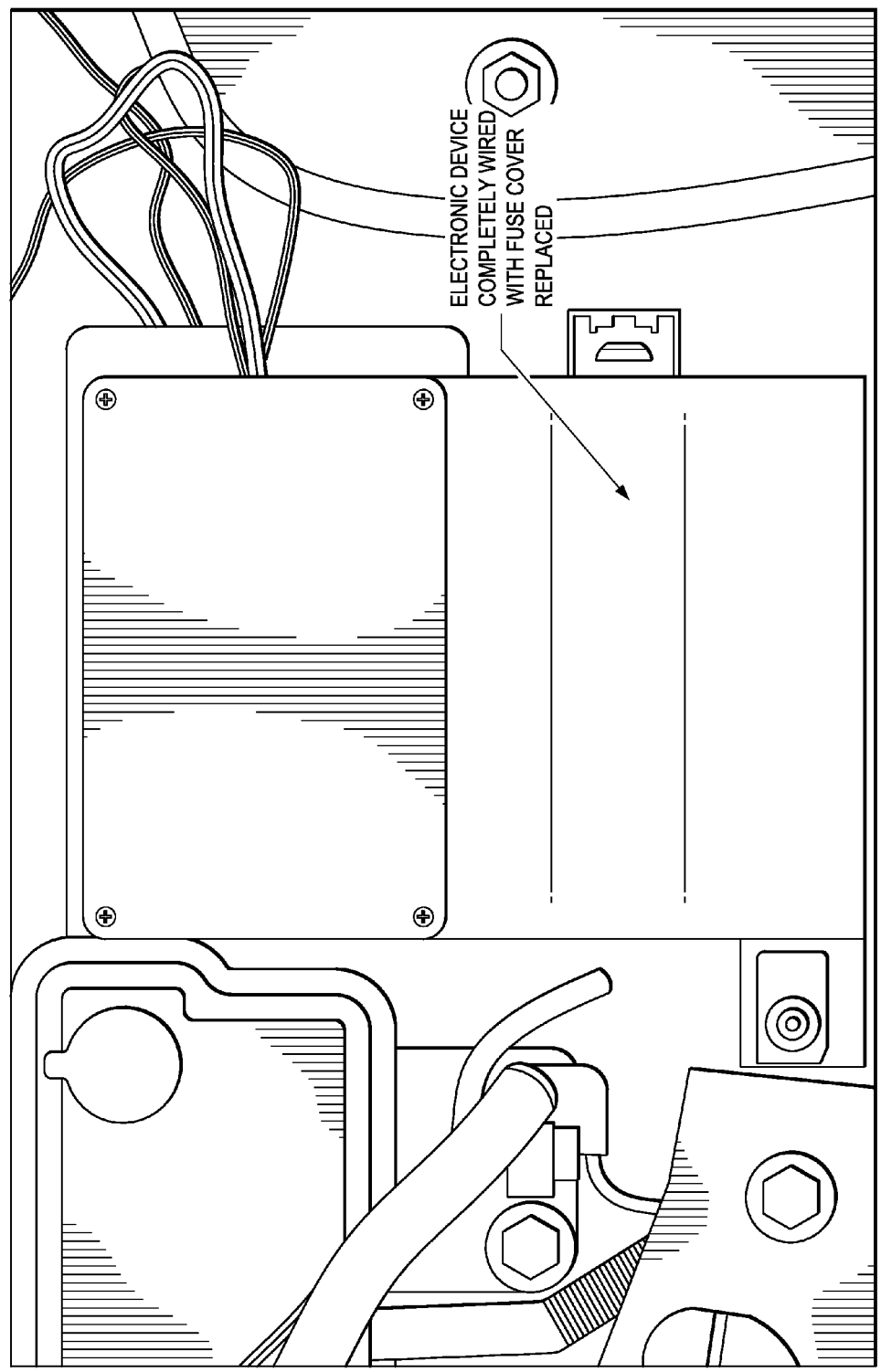
FIG. 8 is a picture of the ABS/ESC activated rapid fire brake light device installed on a vehicle with fuse box cover replaced in accordance with one embodiment of the present invention.

Referring now to FIGS. 6-8, various pictures of the device 500 of FIG. 5 in accordance with one embodiment of the present invention are shown. FIG. 6 is a picture of circuit board of the ABS/ESC activated rapid fire device 500. FIG. 7 is a picture of the connections to automobile fuse box of the installed ABS/ESC activated rapid fire brake light device 500. FIG. 8 is a picture of the location on automobile of the installed ABS/ESC activated rapid fire brake light device 500 with fuse cover replaced.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. An apparatus comprising:
a first connector configured to plug into an antilock brake system pump motor circuit on a fuse panel of a vehicle;
a second connector configured to plug into a brake light circuit on the fuse panel of the vehicle;
an ignition signal detection circuit configured to be positioned next to an ignition latching relay on the fuse panel of the vehicle;
an antilock brake system and/or electronic stability control (ABS/ESC) signal detection circuit connected to the first connector;
a control circuit connected to the ignition signal detection circuit and the ABS/ESC signal detection circuit that sends one or more control signals to a brake light signal generation circuit whenever the ignition signal detection circuit detects an ignition signal and the ABS/ESC signal detection circuit detects an ABS/ESC signal;
the brake light signal generation circuit connected to the control circuit and the second connector that causes a brake lights of the vehicle to flash whenever the one or more control signals are received from the control circuit; and
a power supply connected to the control circuit and the brake light signal generation circuit.

2. The apparatus as recited in claim 1, wherein the ignition signal detection circuit comprises:
a second magnetic reed switch configured to be positioned next to the ignition latching relay on the fuse panel of the vehicle; and
a timer circuit connected to the second magnetic reed switch, the ABS/ESC signal detection circuit, the control circuit and the power supply that disables the brake light signal generation circuit for a time period after an ignition signal is detected by the second magnetic reed switch.

3. The apparatus as recited in claim 1, further comprising:
a housing that encloses at least a portion of the ABS/ESC signal detection circuit, at least a portion of the brake light signal generation circuit, at least a portion of the power supply and the control circuit; and
a first wire connecting the first connector to the portion of the ABS/ESC signal detection circuit within the enclosure; and
a second wire connecting the second connector to the portion of the brake light signal generation circuit within the enclosure.

4. The apparatus as recited in claim 1, the power supply comprising a battery and/or a power supply connector configured to connect to a vehicle power supply.

5. The apparatus as recited in claim 4, further comprising a battery recharging circuit that recharges the battery from the vehicle power supply.

6. The apparatus as recited in claim 1, wherein:
the first connector is a cartridge type fuse plug; and
the ABS/ESC signal detection circuit comprises an induction coil detector connected to the cartridge type fuse plug, and a first magnetic reed switch connected to the induction coil detector.

7. The apparatus as recited in claim 2, wherein:
the timer circuit comprises a divide-by-two counter circuit and a timer diagnostic bypass circuit; and
the control circuit comprises a timed gate oscillator connected to a monostable multivibrator circuit.

8. The apparatus as recited in claim 1, wherein:
the second connector is a blade type fuse plug; and
the brake light signal generation circuit comprises a normally closed relay connected to the blade type fuse plug, and a transistor switch connected to the normally closed relay.

9. The apparatus as recited in claim 1, further comprising an on/off switch that disables the apparatus without preventing normal operation of the vehicle.

10. The apparatus as recited in claim 1, further comprising a flash rate speed control circuit connected to the control circuit.

11. The apparatus as recited in claim 10, wherein the flash rate speed control circuit operates at a first flash rate for incandescent brake lights and a second flash rate for solid-state brake lights.

12. The apparatus as recited in claim 1, wherein the control circuit generates the one or more control signals for a minimum period of time regardless of a duration of the ABS/ESC signal.

13. The apparatus as recited in claim 1, wherein the first connector and the second connector plug into and out of the fuse panel of the vehicle without any modification of an electrical or control system of the vehicle.

14. An apparatus comprising:
a first connector configured to plug into an ABS pump motor circuit on a fuse panel of a vehicle;
a second connector configured to plug into a brake light circuit on the fuse panel of the vehicle;
an induction coil detector connected to the first connector;
a first magnetic reed switch connected to the induction coil detector;
a second magnetic reed switch configured to be positioned next to an ignition latching relay on the fuse panel of the vehicle;
a timer circuit connected to the first magnetic reed switch and the second magnetic reed switch that disables a brake light signal generation circuit for a time period after the second magnetic reed switch detects an ignition signal;
a control circuit connected to the first magnetic reed switch and the timer circuit, wherein the control circuit sends one or more control signals to the brake light generation circuit whenever the first magnetic reed switch detects an antilock brake system and/or electronic stability control (ABS/ESC) signal;
the brake light signal generation circuit connected to the control circuit that causes a brake lights of the vehicle to flash whenever the one or more control signals are received from the control circuit and the brake light signal generation circuit is not disabled; and
a power supply connected to the timer circuit, the control circuit and the brake light signal generation circuit.

15. The apparatus as recited in claim 14, further comprising:
a housing that encloses the induction coil detector, the first magnetic reed switch, at least a portion of the brake light signal generation circuit, at least a portion of the power supply, the timer circuit and the control circuit;
a first wire connecting the first connector to the induction coil detector within the enclosure;
a second wire connecting the third connector to the portion of the brake light signal generation circuit within the enclosure; and
a third wire connecting the second magnetic reed switch to the timer circuit within the enclosure.

16. The apparatus as recited in claim 14, wherein:
the timer circuit comprises a divide-by-two counter circuit and a timer diagnostic bypass circuit; and
the control circuit comprises a timed gate oscillator connected to a monostable multivibrator circuit.

17. The apparatus as recited in claim 14, wherein:
the first connector is a cartridge type fuse plug;
the second connector is a blade type fuse plug; and
the brake light signal generation circuit comprises a normally closed relay connected to the blade type fuse plug, and a transistor switch connected to the normally closed relay.

18. The apparatus as recited in claim 14, further comprising a flash rate speed control circuit connected to the control circuit.

19. The apparatus as recited in claim 18, wherein the flash rate speed control circuit operates at a first flash rate for incandescent brake lights and a second flash rate for solid-state brake lights.

20. The apparatus as recited in claim 14, wherein the control circuit generates the one or more control signals for a minimum period of time regardless of a duration of the ABS/ESC signal.

21. The apparatus as recited in claim 14, wherein the first connector and the second connector plug into the fuse panel of the vehicle without any modification of an electrical or control system of the vehicle.

22. A method for flashing a brake lights of a vehicle comprising the steps of:

providing an apparatus comprising a first connector configured to plug into an antilock brake system pump motor circuit on a fuse panel of a vehicle, a second connector configured to plug into a brake light circuit on the fuse panel of the vehicle, an antilock brake system and/or electronic stability control (ABS/ESC) signal detection circuit connected to the first connector, an ignition signal detection circuit configured to be positioned next to an ignition latching relay on the fuse panel of the vehicle, a control circuit connected to ignition detection circuit and the ABS/ESC signal detection circuit, a brake light signal generation circuit connected to the control circuit and the second connector, and a power supply connected to the control circuit and the brake light signal generation circuit;

sending one or more control signals to the brake light generation circuit using the control circuit whenever the ignition signal detection circuit detects and ignition signal and the ABS/ESC signal detection circuit detects an ABS/ESC signal; and causing the brake lights of the vehicle to flash using the brake light signal generation circuit whenever the one or more control signals are received from the control circuit.

23. The method as recited in claim 22, wherein:

the ignition signal detection circuit comprises a second magnetic reed switch configured to be positioned next to the ignition latching relay on the fuse panel of the vehicle, and a timer circuit connected to the second magnetic reed switch, the ABS/ESC signal detection circuit, the control circuit and the power supply; and the method further comprises disabling the brake light signal generation circuit for a time period after the second magnetic reed switch detects an ignition signal.

24. The method as recited in claim 22, further comprising installing the apparatus by plugging the first connector into an ABS pump motor circuit on a fuse panel of a vehicle, and plugging the second connector into a brake light circuit on the fuse panel of the vehicle.

25. The method as recited in claim 22, further comprising the step of flashing the brake lights at a first flash rate for incandescent brake lights and a second flash rate for solid-state brake lights.

26. The method as recited in claim 22, further comprising the step of generating the one or more control signals for a minimum period of time regardless of a duration of the ABS/ESC signal.

\* \* \* \* \*